_United States Patent Office_  3,277,086
Patented Oct. 4, 1966

3,277,086
1,2,4-BENZOTHIADIAZINE 1,1-DIOXIDES HAVING A HETEROCYCLIC RING FUSED TO THE "b" FACE THEREOF
Peter H. L. Wei, Upper Darby, and Stanley C. Bell and Scott J. Childress, Philadelphia, Pa., assignors to American Home Products Corporation, New York, N.Y., a corporation of Delaware
No Drawing. Filed July 7, 1964, Ser. No. 380,933
5 Claims. (Cl. 260—243)

The present invention relates to pharmacologically active, novel 1,2,4-benzothiadiazine 1,1-dioxides having a heterocyclic ring fused to the "b" face thereof. The invention is also concerned with a process for making the claimed compounds.

While the 1,2,4-benzothiadiazine 1,1-dioxide nucleus has been extensively investigated by pharmaceutical chemists who have attached thereto a large number of substituents in an effort to discover new therapeutically active compounds, few compounds are known which have a heterocyclic ring fused to the "b" face of said nucleus.

The claimed compounds having the described novel molecular configuration exhibit various pharmacological effects as determined by standard test procedures in warm blooded animals. Thus particular compounds embraced by the present invention manifest diuretic, hypotensive and central nervous system stimulant activity. Said compounds are represented by the following formula:

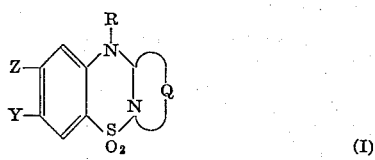
(I)

In the above formula, Z represents hydrogen, halogen, preferably chlorine, and (lower)alkyl, preferably methyl; Y represents hydrogen, halogen, preferably chlorine, (lower)alkyl, preferably methyl, 2-alkoxy-1-pyrrolidinylsulfonyl, 2-alkoxy-piperidin-1-ylsulfonyl, and (2-ethoxyhexahydroazepin-1-ylsulfonyl). Q is a polymethylene group having from 3 to 5 carbon atoms therein. R is hydrogen or lower alkyl having from 1 to 5 carbons therein.

The novel compounds made available by the present invention are prepared by reacting a known aniline sulfonyl chloride with a known ω-aminoalkyl acetal. The aniline sulfonyl halide is represented by the formula:

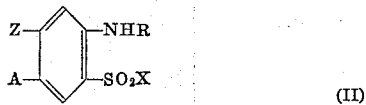
(II)

where Z and R are as defined above; X is chlorine or bromine; and A is halogen, preferably bromine or chlorine, (lower)alkyl, or a sulfonyl halide group, preferably a sulfonyl chloride group. The formula of the ω-aminoalkyl acetal is:

$$H_2N-Q-CH(OC_2H_5)_2$$

(III)

where Q is as previously defined.

The reaction whereby the claimed compounds are produced can proceed in either one of two routes, depending upon the precise nature of substituent A in the anilinesulfonyl halide (II). Where said substituent is inert with respect to the active hydrogen of the ω-aminoalkyl acetal; i.e., where it is not a sulfonyl halide group, the reaction proceeds between substantially stoichiometric amounts of the respective reactants, as follows:

REACTION A

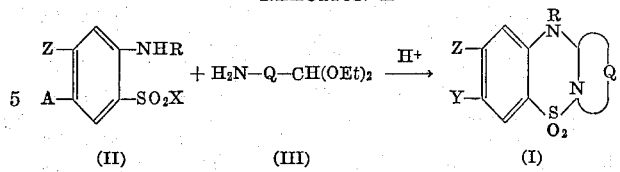

In accordance with reaction A, a solution of an anilinesulfonyl halide (II) in an inert solvent such as dimethoxyethane, dioxane, or chloroform is added at room temperature to a solution of an α-aminoalkyl acetal (III) in a similar solvent. The resulting solution is diluted with water and acidified with a mineral acid such as hydrochloric acid. The acidified solution then is cooled to precipitate a solid product (I) which can be purified by recrystallizing from alcohol.

In the case where the aniline reactant (II) is a 3-substituted-aniline-4,6-disulfonyl halide; i.e., where substituent A also is a sulfonyl halide group, the reaction proceeds as shown below with the formation of an isolatable N,N'-bis (ω,ω-diethoxyalkyl)-4,6-disulfamylaniline (IV):

REACTION B

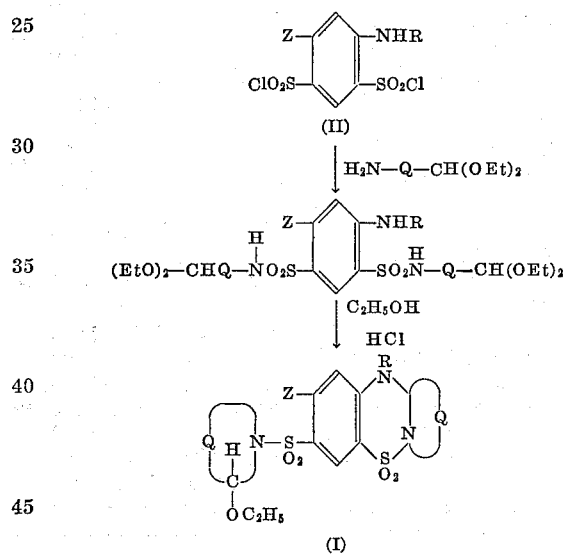

(I)

In reaction B, a solution of an aniline sulfonyl halide in a solvent such as dioxane, chloroform, or dimethoxyethane is slowly added to a solution containing a ω-aminoalkyl acetal, and an acid scavenger such as triethylamine, in a similar solvent. The reaction medium is kept at room temperature and agitated for a few minutes. After this time, the reaction mass is diluted with water and extracted with chloroform. Next, the choloroform extracts are dried with a suitable drying agent; e.g., anhydrous magnesium sulfate. Following this drying procedure, the drying agent is removed and the solution is concentrated to dryness. The thus-obtained residue which consists mainly of the crude intermediate (IV) then is dissolved in ethanol. The resulting solution is acidified with a mineral acid such as hydrochloric acid and warmed to precipitate the solid product (I) which can be purified by recrystallizing from a mixture of dimethoxyethane and ethanol.

Where N-alkylated final products are desired (i.e., compounds having R=lower alkyl), it is possible to start with the N-alkylanilino starting materials. For better yields, it is more advantageous to N-alkylate the final products in conventional fashion, by, for example, treating them in an inert polar solvent with a lower alkyl bromide or iodide in the presence of a basic condensing agent such as an alkali metal hydride, alkanolate or amide.

The 3-substituted aniline-4,6-disulfonylchloride starting material can be prepared by procedures described in the literature and preferably by the procedure in Monatsh. Chem. 48, 87 (1927), wherein a meta-substituted aniline is treated with 10 to 20 parts by weight of a halosulfonic acid followed by the addition of 90 to 170 parts by weight of sodium chloride. The reaction mass is heated at about 150° C. for about 2 hours following which the reaction mixture is poured into water and the resultant aniline sulfonyl halide precipitates.

The starting ω-aminoalkyl acetals can be prepared by treating the corresponding ω-haloalkyl acetals with sodium cyanide to replace the halogen atom by a cyano group which is then reduced to an amino group with lithium aluminum hydride.

The present invention is better illustrated by reference to the following examples. It is to be kept in mind that these examples are only given to generally show the processes leading to the new compounds and are not intended to limit the invention.

EXAMPLE 1.—PREPARATION OF 7-CHLORO-2,3, 10,10a-TETRAHYDRO - 8-METHYL-1H-PYRROLO [1,2-b] [1,2,4]BENZOTHIADIAZINE 5,5-DIOXIDE

A solution of 3.0 g. of 2-amino-5-chloro-4-methylbenzenesulfonyl chloride in dimethoxyethane was added to a solution of 2.0 g. ω-aminobutyraldehyde diethylacetal and 2.0 g. of dimethylaniline in dimethoxyethane. The reaction mixture became warm and slightly colored. After 10 minutes, the reaction mixture was diluted with water and acidified with hydrochloric acid. On cooling, there precipitated out 1.7 g. of solid which was crystallized from alcohol. The pure compound had a M.P. 214–216° C.

Analysis.—Calcd. for $C_{11}H_{13}ClN_2O_2S$: C, 48.42; H, 4.80; N, 10.27; Cl, 13.00; S, 11.75. Found: C, 48.13; H, 4.68; N, 9.74; Cl, 13.25; S, 11.4.

EXAMPLE 2.—PREPARATION OF 8-CHLORO-7-(2-ETHOXY - 1-PYRROLIDINYLSULFONYL)-2,3,10, 10a-TETRAHYDRO - 1H-PYRROLO[1,2-b] [1,2,4] BENZOTHIADIAZINE 5,5-DIOXIDE

A dimethoxyethane solution of 6.5 g. of 3-chloroaniline-4,6-disulfonylchloride was slowly added to a cold solution of 5.85 g. (0.044 m.) of ω-aminobutyraldehyde diethylacetal in dimethoxyethane, containing 4.0 g. (0.04 m.) of triethylamine. The mixture was stirred for 10 min., diluted with water and extracted with chloroform. The chloroform extracts were dried over anhydrous magnesium sulfate. After the drying agent was removed the solution was concentrated and the residue dissolved in ethanol. After a few drops of hydrochloric acid was added, the solution was warmed on a steam bath for 10 min. Solids were collected and recrystallized from a mixture of dimethoxyethane and ethanol, M.P. 170–2° C.

EXAMPLE 3.—PREPARATION OF 8-CHLORO-7-(2-METHOXY - 1 - PYRROLIDINYLSULFONYL)-2,3, 10,10aTETRAHYDRO-1H-PYRROLO-(1,2-b) (1,2,4) (1,2,4)-BENZOTHIADIAZINE 5,5-DIOXIDE

A dimethoxyethane solution of 6.5 g. of 3-chloroaniline 4,6-disulfonylchloride is slowly added to a cold solution of 5.85 g. of α-aminobutyraldehyde dimethylacetal in dimethoxyethane, containing 4.0 g. of acid scavenger. The mixture is stirred for 10 min., diluted with water and extracted with chloroform. The chloroform extract is dried over anhydrous magnesium sulfate. After the drying agent is removed, the solution is concentrated and the residue dissolved in methanol. After a few drops of hydrochloric acid is added, the solution is warmed on a steam bath for 10 min. The product precipitates on cooling to room temperature.

When the procedure of Example 1 is applied to the starting materials listed below, the corresponding products hereinafter disclosed are obtained:

| Starting Compounds | Products |
|---|---|
| 2-amino-5-ethyl-4-bromobenzene sulfonyl bromide and ω-aminovaleraldehyde diethyl acetal. | 2-bromo-3-ethyl, 7,8,9,10,10a,11-hexahydropyrido[1,2-b] [1,2,4] benzothiadiazine 5,5-dioxide. |
| 2-anilinesulfonyl chloride and ω-aminocaproaldehyde diethyl acetal. | 8,9,10,11,11a,12-hexahydro-7H-azepino[1,2-b] [1,2,4] benzothiadiazine 5,5-dioxide. |
| 2-amino-5-chloro-4-methylbenzene and ω-aminocaproaldehyde diethyl acetal. | 3-chloro-8,9,10,11,11a,12-hexahydro-2-methyl-7H-azepino[1,2-b] [1,2,4] benzothiadiazine 5,5-dioxide. |
| 2-anilinesulfonyl chloride and ω-aminobutyraldehyde diethyl acetal. | 2,3,10,10a-tetrahydro-1H-pyrrolo[1,2,-b] [1,2,4] benzothiadiazine 5,5-dioxide. |
| 2-anilinesulfonyl chloride and ω-aminovaleraldehyde diethyl acetal. | 7,8,9,10,10a,11-hexahydropyrido[1,2-b] [1,2,4] benzothiadiazine 5,5-dioxide. |
| 2-amino-4,5-dimethylbenzene and ω-aminobutyraldehyde diethylacetal. | 7,8-dimethyl-2,3,10,10a-tetrahydro-1H-pyrrolo[1,2-b] [1,2,4] benzothiadiazine 5,5-dioxide. |
| 2-amino-4,5-dimethylbenzene and ω-aminovaleraldehyde diethyl acetal. | 2,3-dimethyl-7,8,9,10,10a,11-hexahydropyrido[1,2-b] [1,2,4] benzothiadiazine 5,5-dioxide. |
| 2-amino-4,5-dimethylbenzene and ω-aminocaproaldehyde diethyl acetal. | 3,4-dimethyl-8,9,10,10a,11-hexahydro-7H-azepino[1,2-b] [1,2,4] benzothiadiazine 5,5-dioxide. |

When the procedure of Example 2 is applied to the starting products listed below the intermediates and final products given hereinafter are obtained:

| Starting materials | Intermediates | Final Products |
|---|---|---|
| 3-methylaniline-4,6-disulfonylchloride and ω-aminobutyraldehyde diethyl acetal. | 3-methyl-N,N'-bis(4,4-diethoxy butyl)-4,6-disulfamylaniline. | 8-methyl-7-(2-ethoxy-1-pyrrolidinylsulfonyl)-2,3,10,10a-tetrahydro-1H-pyrrolo[1,2-b] [1,2,4]benzothiadiazine 5,5-dioxide. |
| 3-bromoaniline-4,6-disulfonyl chloride and ω-aminobutyraldehyde. | 3-bromo-N,N'-bis(4,4-diethoxybutyl)-4,6-disulfamylaniline. | 8-bromo-7-(2-ethyoxy-1-pyrrolidinylsulfonyl)-2,3,10,10a-tetrahydro-1H-pyrrolo[1,2-b] [1,2,4]benzothiadiazine 5,5-dioxide. |
| Aniline-4,6-disulfonyl chloride and ω-aminovaleraldehyde diethyl acetal. | N,N'-bis(4,4-diethoxypentyl)-4,6-disulfamyl aniline. | 3-(2-ethoxy-1-piperidinylsulfonyl)-7,8,9,10,10a,11-hexahydropyridino[1,2-b][1,2,4]benzothiadiazine 5,5-dioxide. |
| 3-methylaniline-4,6-disulfonyl chloride and ω-aminovaleraldehyde diethyl acetal. | 3-methyl-N,N'-bis(4,4-diethoxypentyl)-4,6-disulfamy laniline. | 2-methyl-3-(2-ethoxy-1-piperidinylsulfonyl)-7,8,9,10,10a,11-hexahydropyrido[1,2-b][1,2,4]-benzothiadiazine 5,5-dioxide. |
| 3-chloroaniline-4,6-disulfonyl chloride and ω-aminovaleraldehyde diethyl acetal. | 3-chloro-N,N'-bis(4,4-diethoxypentyl)-4,6-disulfamylaniline. | 2-chloro-3-(2-ethoxy-1-piperidinylsulfonyl)-7,8,9,10,10a,11-hexahydropyrido[1,2-b][1,2,4]-benzothiadiazine 5,5-dioxide. |
| 3-bromoaniline-4,6-disulfonyl chloride and ω-aminovaleraldehyde diethyl acetal. | 3-bromo-N,N'-bis(4,4-diethoxypentyl)-4,6-disulfamylaniline. | 2-bromo-3-(2-ethoxy-1-piperidinylsulfonyl)-7,8,9,10,10a,11-hexahydropyrido [1,2-b][1,2,4]-benzothiadiazine 5,5-dioxide. |
| Aniline-4,6-disulfonyl chloride and ω-aminocaproaldehyde diethyl acetal. | N,N'-bis(4,4-diethoxyhexyl)-4,6-disulfamyl aniline. | 3-(2-ethoxy-1-hexahydro-azepinyl-7H-azepino[1,2-b] [1,2,4]benzothiadiazine 5,5-dioxide. |
| 3-methylaniline-4,6-disulfonyl chloride and ω-aminocaproaldehyde. | 3-methyl-N,N'-bis(4,4-diethoxyhexyl)-4,6-disulfamylaniline. | 2-methyl-3-(2-ethoxy-1-hexahydro-azepinylsulfonyl)-8,9,10,11,11a,12-hexahydro-7H-azepino[1,2-b][1,2,4]benzothiadiazine 5,5-dioxide. |
| 3-chloroaniline-4,6-disulfonyl chloride and ω-aminocaproaldehyde. | 3-chloro-N,N'-bis(4,4-diethoxyhexyl)-4,6-disulfamyl aniline. | 3-(2-ethoxyhexahydroazoazepin-1-ylsulfonyl)-8,9,10,11,11a,12-hexahydro-10-chloro-7H-azepino[1,2-b][1,2,4]benzothiadiazine 5,5-dioxide. |
| 3-bromoaniline-4,6-disulfonyl chloride and ω-aminocaproaldehyde. | 3-bromo-N,N'-bis(4,4-diethoxyhexyl)-4,6-disulfamyl aniline. | 3-(2-ethoxyhexahydroazepin-1-ylsulfonyl)-8,9,10,11,11a,12-hexahydro-10-bromo-7H-azepino[1,2-b][1,2,4]benzothiadiazine 5,5-dioxide. |

As stated above, there can be prepared the corresponding N-alkylated compounds of which the following are representative:

2-bromo - 11 - ethyl-8,9,10,11,11a,12-hexahydro-7H-azepino[1,2-b][1,2,4]benzothiadiazine 5,5-dioxide; 3-chloro-8,9,10,11,11a,12-hexahydro - 2,11 - dimethyl - 7H-azepino[1,2,4][1,2,4]benzothiadiazine 5,5-dioxide; 10-ethyl-2,3,10,10a-tetrahydro - 1H - pyrrolo[1,2-b][1,2,4]benzothiadiazine 5,5-dioxide; 7,8,9,10,10a,11-hexahydro-10 - butylpyrido[1,2-b][1,2,4]benzothiadiazine 5,5 - dioxide; 10-butyl 8-methyl-7-(2-ethoxy-1-pyrrolidinyl-sulfonyl)-2,3,10,10a-tetrahydro - 1H - pyrrolo[1,2-b][1,2,4]benzothiadiazine 5,5-dioxide; 2-bromo-3-(2-ethoxyhexahydropyridin - 1 - ylsulfonyl) - 8,9,10,11,11a,12 - hexahydro-11-ethylpyrido[1,2-b][1,2,4]benzothiadiazine 5,5-dioxide; 3-(2-ethoxyhexahydroazepin - 1 - ylsulfonyl)-8,9,10,11,11a,12-hexahydro - 2 - chloro-11-propyl-7H-azepino[1,2-b][1,2,4]benzothiadiazine 5,5 - dioxide; 3-(2-ethoxyhexahydroazepin - 1 - ylsulfonyl)-8,9,10,11,11a,12-hexahydro-2-bromo-11-butyl - 1H - azepino[1,2-b][1,2,4] benzothiadiazine 5,5-dioxide.

The effective dosage of the present compounds can vary over a wide range from about 50 to about 500 milligram per day or more, administered in the form of tablets, pills, capsules or of injectable solutions with the proper solid or liquid carrier. As the present compounds can be placed in suitable dosage forms by pharmacist only one example is given of the various possible unit dosage forms.

EXAMPLE 4

Tablet

|  | Mg. |
|---|---|
| 7-chloro-2,3,10,10a-tetrahydro - 8 - methyl-1H-pyrrolo[1,2-b][1,2,4]benzothiadiazine 5,5-dioxide | 50 |
| Lactose | 26.2 |
| Starch, U.S.P. | 20.6 |
| Magnesium stearate | 0.5 |

In making the above tablet, the active ingredients are mixed with the lactose and part of the starch and granulated with a sufficient quantity of paste made from the remainder of the starch. The granulated material is dried at 40–50° C. and screened through 90 mesh. Next the magnesium stearate is screened onto the granulation with which it is blended. Tablets are pressed therefrom with a suitable tabletting machine.

What is claimed is:
1. A compound of the formula:

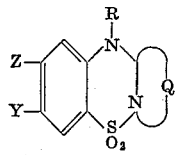

wherein Q is a polymethylene group having from 3 to 5 carbon atoms therein; Y is selected from the group consisting of hydrogen, chloro, bromo, fluoro, (lower)alkyl, 2-(lower)alkoxy-1-pyrrolidinyl sulfonyl, 2-(lower)alkoxy piperidin-1-ylsulfonyl and 2-(lower)alkoxyhexahydroazepin-1-ylsulfonyl; Z is selected from the group consisting of hydrogen, chloro, bromo, fluoro and (lower)alkyl; R is selected from the group consisting of hydrogen and (lower)alkyl.

2. 7-chloro-2,3,10,10a-tetrahydro - 8 - (lower)alkyl-1H-pyrrolo[1,2-b][1,2,4]benzothiadiazine 5,5-dioxide.

3. 8-chloro - 7 - (2-loweralkoxy - 1 - pyrrolidinylsulfonyl)-2,3,10,10a-tetrahydro - 1H - pyrrolo[1,2-b][1,2,4]benzothiadiazine 5,5-dioxide.

4. 8-chloro - 7 - (2-ethoxy-1-pyrrolidinylsulfonyl)-2,3,10,10a-tetrahydro - 1H - pyrrolo[1,2-b][1,2,4]benzothiadiazine 5,5-dioxide.

5. 7-chloro-2,3,10,10a-tetrahydro - 8 - methyl-1H-pyrrolo[1,2-b][1,2,4]benzothiadiazine 5,5-dioxide.

References Cited by the Examiner

UNITED STATES PATENTS

| 2,965,655 | 12/1960 | Novello | 260—397.7 |
| 2,970,154 | 1/1961 | Werner | 260—397.7 |
| 3,163,643 | 12/1964 | deStevens et al. | 260—243 |
| 3,163,645 | 12/1964 | deStevens et al. | 260—243 |

NICHOLAS S. RIZZO, *Primary Examiner.*